(12) United States Patent
Doman et al.

(10) Patent No.: US 10,358,785 B2
(45) Date of Patent: Jul. 23, 2019

(54) LANDSCAPE EDGING

(71) Applicant: Landecor LLC, Alpine, UT (US)

(72) Inventors: Bryce Doman, Alpine, UT (US); Verl Doman, Cedar Hills, UT (US)

(73) Assignee: Landecor LLC, Alpine, UT (US)

( * ) Notice: Subject to any disclaimer, the term of this patent is extended or adjusted under 35 U.S.C. 154(b) by 0 days.

(21) Appl. No.: 15/670,884

(22) Filed: Aug. 7, 2017

(65) Prior Publication Data

US 2018/0127942 A1 May 10, 2018

Related U.S. Application Data

(63) Continuation of application No. 12/130,715, filed on May 30, 2008, now abandoned.

(51) Int. Cl.
*A01G 9/28* (2018.01)
*E04C 1/00* (2006.01)
*E02D 27/00* (2006.01)

(52) U.S. Cl.
CPC .............. *E02D 27/00* (2013.01); *A01G 9/28* (2018.02); *E04C 1/00* (2013.01)

(58) Field of Classification Search
CPC .............. E02D 27/00; A01G 9/28; E04C 1/00
See application file for complete search history.

(56) References Cited

U.S. PATENT DOCUMENTS

| | | | |
|---|---|---|---|
| 2,888,779 A | 6/1959 | Hostetter | |
| 3,155,529 A * | 11/1964 | Paturzo | B28B 11/04 118/643 |
| 3,931,700 A * | 1/1976 | Scanni | E01C 5/00 256/59 |
| 4,183,454 A * | 1/1980 | Snell | B23K 9/035 228/50 |
| 4,326,817 A | 4/1982 | Boiardi | |
| 4,747,231 A | 5/1988 | LeMay et al. | |
| 4,858,379 A | 8/1989 | West | |
| 4,934,093 A | 6/1990 | Yanna | |
| 5,119,587 A * | 6/1992 | Waltz | E04H 17/1404 47/33 |
| 5,233,806 A | 8/1993 | Hightower et al. | |
| 5,414,956 A | 5/1995 | Kheradpir | |
| D378,423 S * | 3/1997 | Henry | D25/114 |
| D407,507 S | 3/1999 | Owens et al. | |
| D411,341 S | 6/1999 | Bott | |
| 6,012,254 A | 1/2000 | Gaston | |
| D421,136 S | 2/2000 | Doman | |

(Continued)

FOREIGN PATENT DOCUMENTS

JP 08199530 A * 8/1996

*Primary Examiner* — Phi D A
*Assistant Examiner* — Omar F Hijaz
(74) *Attorney, Agent, or Firm* — Thorpe North & Western, LLP; David W. Osborne

(57) ABSTRACT

A landscape edging block can include a shaped structure having a first and a second end. The first end can include a surface that is concave simultaneously along a horizontal plane and a vertical plane. On the contrary, the second end can include a surface that is convex simultaneously along a horizontal plane and a vertical plane. The shaped structure can include a top and sides configured to resemble decorative stone. Additionally, first end of the block can be configured to engage a second end of a second block in order to form a landscaping border.

20 Claims, 9 Drawing Sheets

(56) References Cited

U.S. PATENT DOCUMENTS

| | | | |
|---|---|---|---|
| D435,305 S | | 12/2000 | Pullen et al. |
| 6,286,251 B1 | | 9/2001 | Whitson |
| D448,859 S | | 10/2001 | Doman |
| D477,419 S | * | 7/2003 | Manthei ................ D25/113 |
| 6,591,547 B1 | | 7/2003 | Staten et al. |
| D488,568 S | * | 4/2004 | MacDonald ............ D25/113 |
| 7,159,367 B1 | * | 1/2007 | King ...................... A01G 1/08 47/33 |
| D557,428 S | | 12/2007 | Doman |
| 7,354,330 B2 | | 4/2008 | Bentley, Jr. |
| 2003/0089031 A1 | | 5/2003 | Wong et al. |
| 2003/0208983 A1 | * | 11/2003 | Kendall ................... E01C 5/00 52/605 |
| 2005/0034362 A1 | | 2/2005 | Anderson et al. |
| 2005/0252101 A1 | | 11/2005 | Anderson et al. |

\* cited by examiner

Fig. 10a
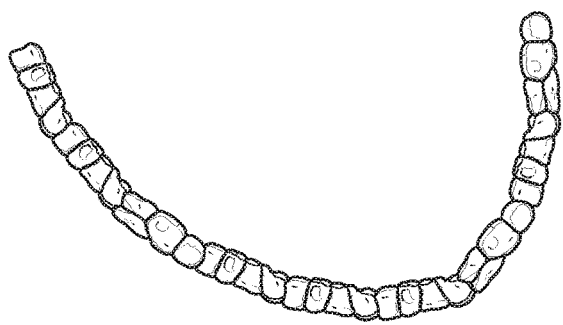
Fig. 10b
Fig. 10c
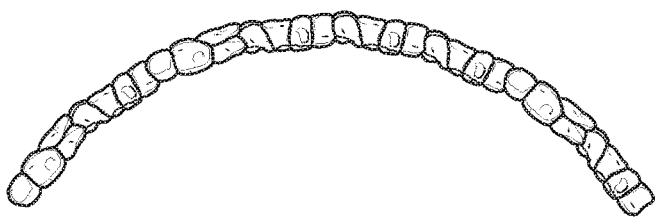
Fig. 10d

LANDSCAPE EDGING

PRIORITY DATA

This application is a continuation of U.S. patent application Ser. No. 12/130,715, filed on May 30, 2008, which is incorporated herein by reference.

BACKGROUND OF THE INVENTION

The past few years have produced a number of improvements in landscaping design. One popular feature includes separating portions of landscaping, such as grass and garden areas, or separating areas of a garden, with borders. To serve the purpose of the dividers, there are a few options available. Lengths of bricks or rocks can be formed into a border, with or without mortaring agents. Unfortunately, properly selecting individual stones and/or bricks to use in a border, and then carefully placing the stones or bricks in an aesthetically pleasing fashion is a tedious and arduous task.

To improve the process, a few sections or blocks of borders have been introduced into the market. Such blocks typically have a pattern, such as scallops, along a top edge as viewed from the side, and have a planar bottom to easily rest upon flat ground. Many blocks have vertically planar edges that can abut a nearby block, thus forming a length of landscaping edging. Unfortunately, blocks meeting in this manner are often prone to undesired movement, such as, e.g., falling over due to nature, or an inadvertent kick. Any less-than-perfect arrangement of such blocks can be quite apparent and unappealing.

As an improvement, some blocks have connection points, either a direct connection to an element anchored in the ground, which does not guarantee proper alignment of the blocks, or a connection of sorts with the neighboring block. Such connections between blocks tend to include angled surfaces in a male-female relationship. To an observer, the connection points are generally quite apparent as viewed from either one or both of a direct side view or a direct top view of the edging line.

Furthermore, few, if any blocks make any allowance for curved or angled edging lines. The few that do are generally configured only for such angled or curved lines and do not function well in a relatively straight line of edging. The blocks configured for relatively straight edging generally have undesirable protrusions and gaps at the joint. For example, one block set includes a lower jutting portion on one end and an overhanging section on the opposite end. The ends are configured such that the overhanging portion of one block can rest atop the lower jutting portion of another block. Such arrangement can work to minimize the visible transition from block to block, however, any curvature or angling of the edging line makes either the jutting portion uncovered or the overhanging portion at least partially left overhanging nothing. As the purpose of the blocks is to minimize the time spent, while producing a visibly seamless landscape edging, there leaves much room for improvement in the field.

SUMMARY OF THE INVENTION

Accordingly, the present invention provides a landscape edging block, associated landscape border, and methods of making and using the same. The landscape edging block can include a shaped structure having a first end and a second end. The first end can include a surface that is concave simultaneously along a horizontal plane and a vertical plane. Further, in some aspects, the second end can include a surface that is convex simultaneously along a horizontal plane and a vertical plane. The shaped structure can have a top and sides configured to resemble decorative stone. Additionally, the first concave end of the block can be configured to engage a second convex end of a second block in order to form a landscaping border.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

FIGS. 10a-10d are direct top views of various landscape edging borders, in accordance with an embodiment of the present invention.

DETAILED DESCRIPTION OF THE INVENTION

Figure 1:
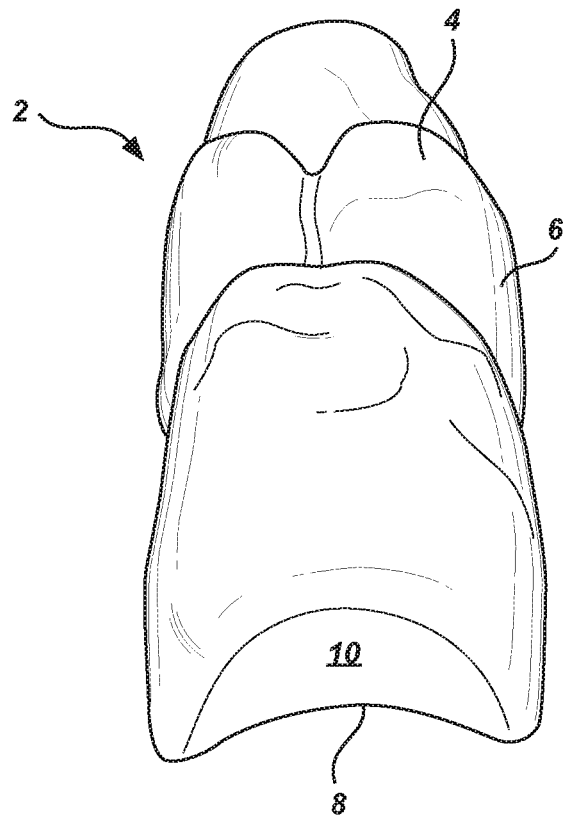
FIG. 1 is a direct view of a first end of a landscape edging block, in accordance with an embodiment of the present invention.

Reference will now be made to the exemplary embodiments, and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

Definitions

In describing and claiming the present invention, the following terminology will be used in accordance with the definitions set forth below.

The singular forms "a," "an," and, "the" include plural referents unless the context clearly dictates otherwise. Thus, for example, reference to "a stone" includes reference to one or more of such stones, and reference to "the block" includes reference to one or more of such blocks.

The terms "convex" and "concave" are used according to their plain and ordinary meaning. When a surface is said to be convex along a particular plane, it is to mean that the surface is convex in relation to that plane.

As used herein, the term "configured to" refers to the purposeful selection, placement, formation, and/or design to effectuate a predetermined function, appearance, or purpose. Therefore, configuring something to do something requires first, an identified objective or purpose, and second, selection and designing to reach the purpose or objective. As such, qualities resulting from manufacture without a predetermined (i.e. determined prior to manufacture) objective or purpose are not considered to result from "configured to" designs.

As used herein, "substantially" refers to situations close to and including 100%. Substantially is used to indicate that, though 100% is desirable, a small deviation therefrom is acceptable. A surface said to be substantially horizontal may not be exactly horizontal, but may, in one instance, include a minor amount of irregularities in the generally horizontal surface, and/or may in a second instance include a continuous and slight incline, i.e. such as would be unnoticeable generally to the naked eye.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, directional-based descriptive terms, such as "end," "front," "back," "side," "top," "bottom," and the like are used strictly for ease of discussion. Such use is not to be interpreted, even when used in claims, as requiring such direction.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

The Invention

An ideal a landscape edging may be one that can be relatively easy and straightforward to form, can have a seamless look that minimizes any transitions between separate portions of the edging, can account for straight, angled, and curved lines while maintaining the seamless nature, and further without requiring specialized parts, can be utilized on a variety of types of ground, including uneven and sloped portions, and can be aesthetically pleasing, and thus add value to the surrounding landscape.

As such, a landscape edging block, landscape border comprising a plurality of the blocks, and methods associated with manufacturing and forming the blocks and border are presented herein. The landscape edging blocks are configured to visibly resemble decorative stone. The blocks eliminate the need to tediously evaluate, match, and arrange stones into a visibly pleasing arrangement. Furthermore, the blocks eliminate the need to cement individual stones together to secure them together and to arrange them as is most pleasing to the eye.

With these goals in mind, a landscape edging block can include a shaped structure having a first end and a second end. The first end can include a surface that is concave simultaneously along a horizontal plane and a vertical plane. The second end can include a surface that is convex simultaneously along a horizontal plane and a vertical plane. The shaped structure can further include a top and sides configured to resemble decorative stone. Furthermore, the first end of the block can be configured to engage a second end of a second block in order to form a landscaping border.

Figure 2:
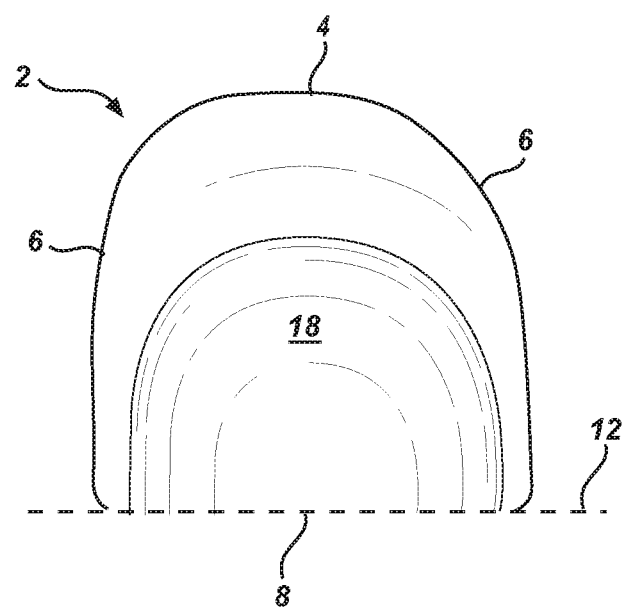
FIG. 2 is a perspective view of a first end of a landscape edging block, in accordance with an embodiment of the present invention.

FIG. 2 shows a direct view of a first end of a landscape edging block. FIG. 1 shows a perspective view of the first end of the same landscape edging block as taken from an angle slightly above the top of the block. As shown the block 2 has a top 4, a bottom 8, and sides 6. The view of FIG. 2 is directly into the concave end 10 of the block. As noted, the concavity is with respect to both a horizontal and a vertical plane. In the present view, the vertical plane is perpendicular to the bottom 8 plane of the block and is further perpendicular to the length of the block, thus forming a plane that cuts a cross-section of the block. The horizontal plane, on the other hand, is substantially parallel to the bottom 8 of the block. The resulting concavity can be described as a relatively small, natural-looking cavernous portion of the formed rock shape. Such concavity is generally not apparent from a direct side or a direct top view of the block, as the concavity is with respect to both a horizontal and a vertical plane. This bi-directional concavity is instrumental in minimizing the transition effect between blocks. Due to the bi-directional concavity, the concave and convex ends of the blocks are relatively disguised to look like stone anomalies, while still fully functioning as engagement locations for blocks to engage one-another and form a border. Furthermore, due to the bi-directional concavity, the blocks have a wide range of angles whereupon the blocks can engage one-another while maintaining a substantially seamless transition from block to block.

Figure 3:
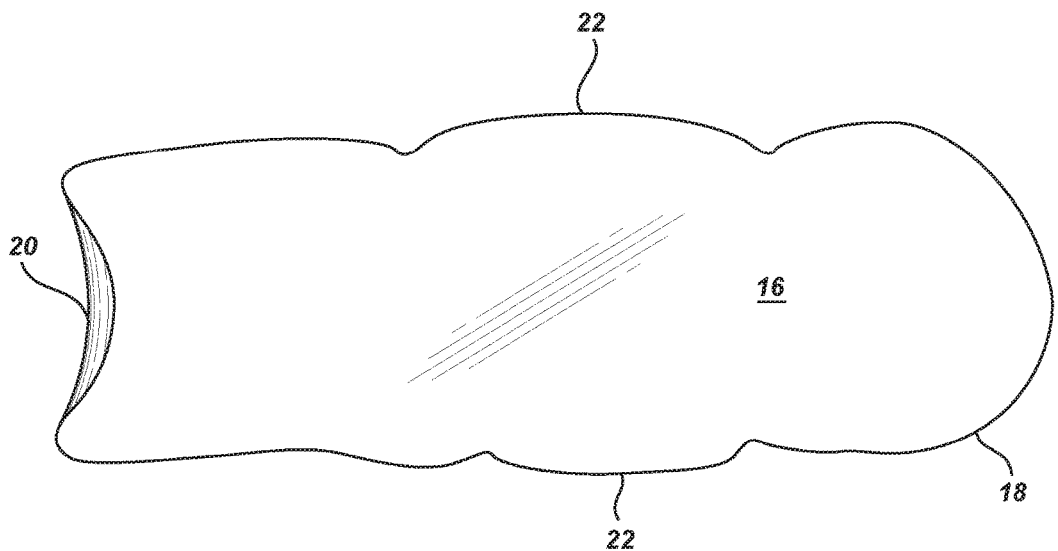
FIG. 3 is a direct view of a bottom surface of a landscape edging block, in accordance with an embodiment of the present invention.

The bottom of the block can be of any design that allows the forming of a landscaping edging using the block. FIG. 3 is a direct view of the bottom 16 of a block as in FIG. 1. The block has a generally planar bottom. Also shown are the sides 22 of the block, the convex end 20, and the concave end 18. Other designs for the bottom of the block can include patterned, directionally textured, configured to fit into an anchoring system, or having an anchoring system as an integral part of the bottom, spiked, tapered, waved, ribbed, etc. To elaborate, the bottom of the block can have a texture configured to prevent lateral movement or slippage from occurring when placed on a variety of surfaces, including, e.g. dirt. Such patterning can include directionally texturing, so as to provide traction to the block against slippage in a particular direction, such as an incline. Furthermore, a variety of anchoring systems have been developed that can be used in conjunction with landscaping edging. Some such anchoring systems require placement in the ground prior to placement of the edging, and leave a portion exposed for easier attachment of the edging to the anchoring system. Although not required, the edging blocks as presently described can include, as an extension of the bottom of the block, an anchoring system, such as, e.g., ground stakes, etc. Furthermore, the bottom of the block can, in one aspect, be configured to elevate above the ground in portions, to allow passage of materials, etc.

The block can be formed of a variety of materials, as any material capable of being formed into a shaped structure having a top and sides configured to resemble decorative stone in shape, and further including a convex end and a concave end, can be utilized. Non-limiting examples of materials that can be utilized to form landscaping blocks includes cement, concrete, composite materials, polymeric materials, ceramics, and mixtures and combinations thereof. In one aspect, the block can comprise or consist essentially of cement. A plurality of materials can be utilized together and can be arranged, in relation to each other, in a variety of ways, including homogeneous mixtures, core-shell type arrangements, heterogeneous mixtures, etc. In one aspect, the block can be substantially hollow. For example, molded plastic could be utilized to form a hollow structure having the outlined shape. Such molded shape could be filled with a similar plastic or other substance for the purpose of, e.g., adding weight to the block.

Depending on the materials used, the blocks can be formed in a variety of ways including molding, and/or chiseling. In one aspect, the blocks will better resemble decorative stone if the top and sides are colored to match decorative stone. As such, in one aspect, the sides and top of the block can include decorative coloring. Such coloring can be applied after the shaped structure is formed, or can be an integral part of the block formation. As a non-limiting example, a block can be formed of cement and coloring agent. The coloring agent or agents can be placed in a mold nearest the areas of the top and sides of the finished block. A cement can be poured over the top and the coloring agent and cement can be partially mixed so as to form a partial layer of coloring agent that penetrates into a depth of the cement. The cement and coloring agent can be cured and then removed from the mold to produce an edging block having coloring as an integral part thereof. Alternatively, decorative coloring can be added to a pre-formed block through any method known in the art, including, but not limited to, painting, chalk, air brushing, dyeing, penciling, etc.

Figure 4:
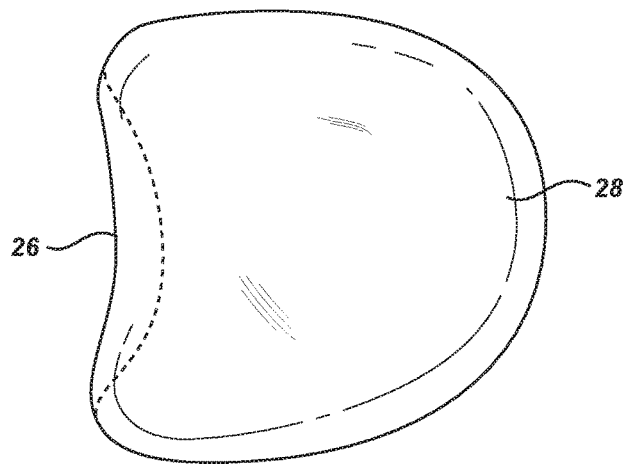
FIG. 4 is a direct view of a top surface of a landscape edging block, in accordance with an embodiment of the present invention.
Figure 5:
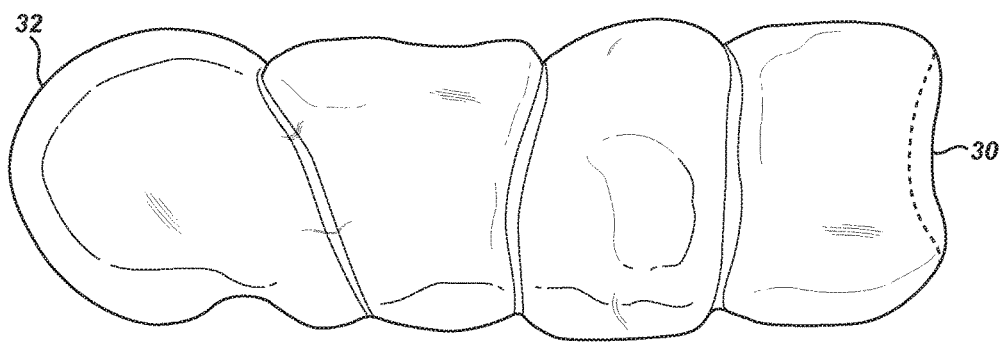
FIG. 5 is a direct view of a top surface of another landscape edging block, in accordance with an embodiment of the present invention.
Figure 6:
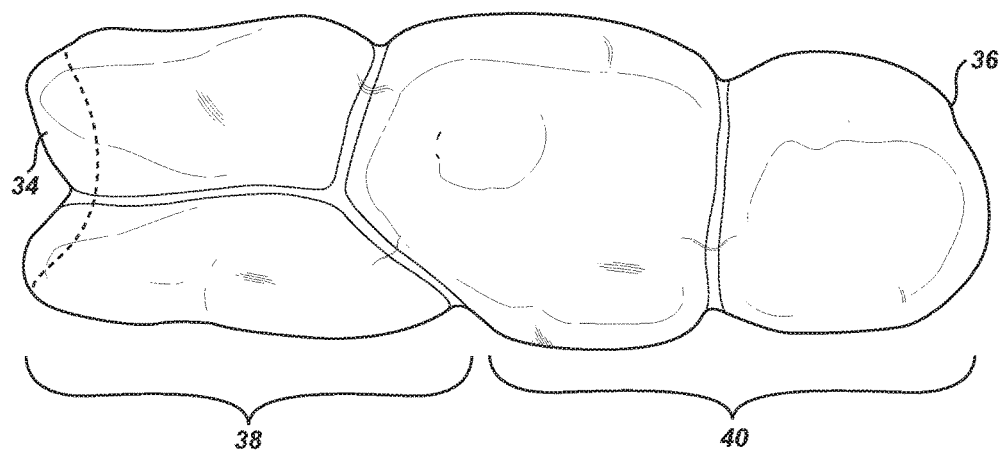
FIG. 6 is a direct view of a top surface of another landscape edging block, in accordance with an embodiment of the present invention.

The block can include a top and sides that are configured to resemble decorative stone. In one aspect, the top and sides can be configured to resemble a single decorative stone. In another aspect, however, the top and sides can be configured to resemble a plurality of decorative stones. As illustrated in FIGS. 4-6, a variety of configurations can be utilized. FIG. 4 illustrates a block in the shape of a single stone having a concave end 26 and a convex end 28. FIG. 5 shows a block configured to resemble a line of three decorative stones, where the block has a concave end 30 and a convex end 32. FIG. 6 illustrates a block configured to resemble a line of decorative stones, where portions of the line of stone are two stones deep 38, and other portions of the line of stones is one stone deep 40. As with the other blocks, the block in FIG. 6 includes a concave end 34 and a convex end 36. As the decorative stone is an appearance and is formed, any number of configurations can be formed of the blocks to resemble decorative stone. The embodiments of FIGS. 5-6 show decorative stone, such as a cobblestone appearance, configured to resemble the stones mortared together. It should be noted that the blocks can be formed so as to give the appearance of any other material holding the stones in place, or any other cementing arrangement of the stones.

Also shown in FIGS. 4-6, the concavity of the concave ends 26, 30, 34 respectively, is not visible from a direct view of the top of the blocks. Furthermore, the convexity of each of the convex ends 28, 32, 36 respectively, is configured to resemble a natural part of the decorative stone appearance. Thus, even though the concave ends of the blocks are configured to be used to form a joint with the convex ends, the blocks have an aesthetically pleasing appearance standing alone, and the function of the concave and convex ends is not immediately apparent upon a first visible inspection of the blocks.

Figure 7:
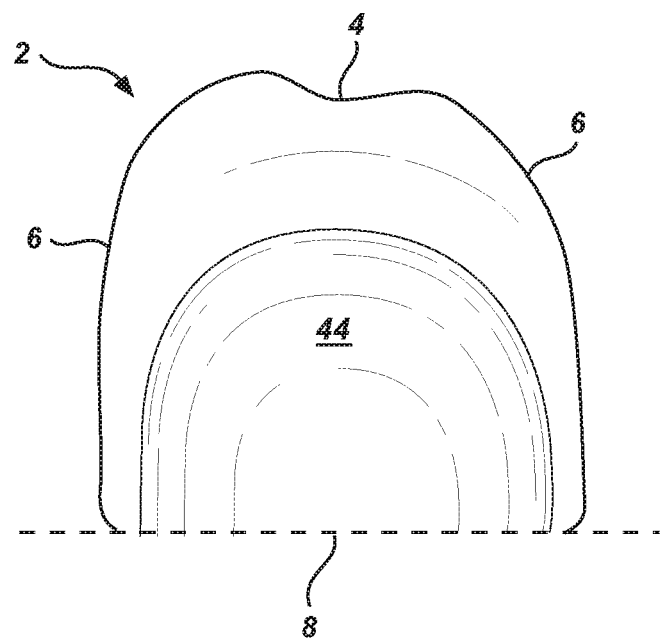
FIG. 7 is a direct view of a second end of a landscape edging block, in accordance with an embodiment of the present invention.
Figure 8:
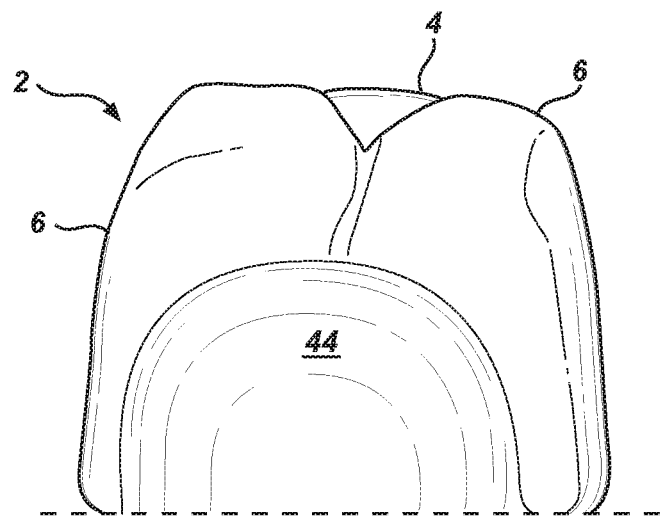
FIG. 8 is a perspective view of a second end of a landscape edging block, in accordance with an embodiment of the present invention.
Figure 9:
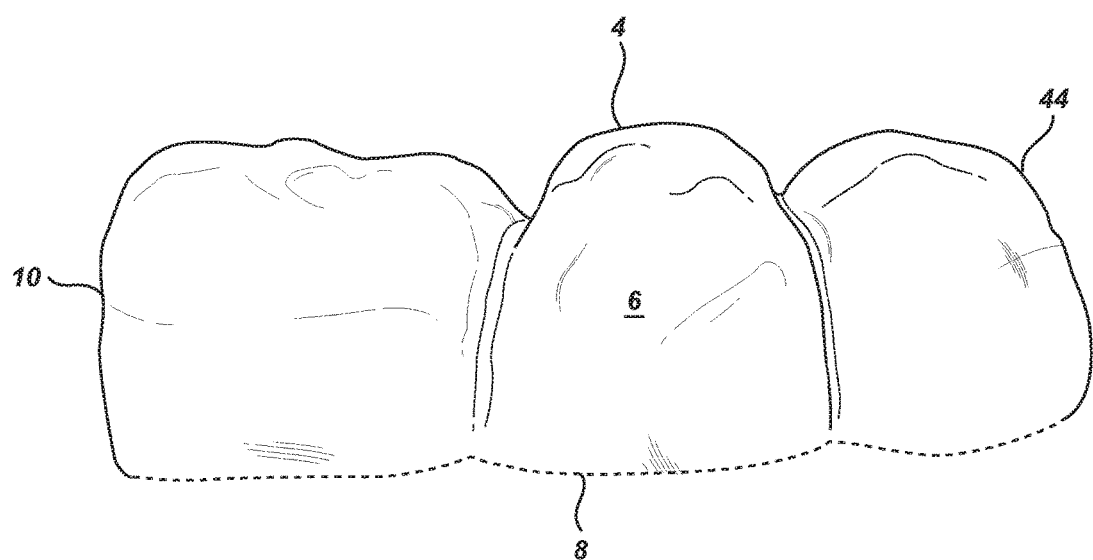
FIG. 9 is a perspective view of a size of a landscape edging block, in accordance with an embodiment of the present invention.

Similar to the views of the first or concave end, FIGS. 7-8 illustrate the second or convex end of the same block as shown in FIG. 1. Specifically, FIG. 7 shows a direct view of a second end of a landscape edging block. FIG. 8 shows a perspective view of the second end of the same landscape edging block as taken from an angle slightly above the top of the block. As shown, the block 2 has a top 4, a bottom 8, and sides 6. The view of FIG. 7 is directly into the convex end 44 of the block. As noted, the convexity is with respect to both a horizontal and a vertical plane. In the present view, vertical plane is substantially perpendicular to the plane of the bottom 8 of the block and is further perpendicular to the length of the block, thus forming a plane that cuts a cross-section of the block from one side to the opposite side. The horizontal plane, on the other hand, is substantially parallel to the bottom 8 of the block. The resulting convexity can be described as a relatively small, natural-looking bulbous extension of the formed rock shape, or as a naturally sloped extension of the rock shape. Furthermore, the convex portion can be configured to be the inverse of the concave portion of the opposite end of the block. Such configuration allows for a tight fit upon engagement of blocks, provided that each block has roughly the same convex and concave shapes. FIG. 9 shows a side view of the block of FIG. 1. The figure shows the concave end 10, the convex end 44, the bottom 8, and the top 4 and side 6 configured to resemble decorative stones cemented together.

The terms convexity and concavity are used herein generally to define the general appearance of a shape and/or formation. It should be understood that such language does not necessarily require geometrically precise shape formation. However, such terminology and shape definition can be useful in describing the general nature and shape of portions of the block. In one aspect, it can be considered that a complete convex or concave shape includes two end points on or near the plane or line from which the convexity or concavity is defined, and that each shape either curves outward from or curves inward from the two points. The central point of the curve, forms a line perpendicular to the line or plane from which the convexity or concavity is defined, and such line is known as the axis of the concavity or convexity. In one aspect, one or both of the convex or concave ends can terminate, or end, at or near an axis of the concavity or of the convexity, meaning that the shape is a truncated convex or truncated concave shape.

Additionally, the portion of each end dedicated to the convexity or concavity, meaning the portion of each end having the cavernous shape or naturally and rounded extension, can include the majority of the end's surface, or can occupy only a portion of the surface of the respective end. Preferably, the surface dedicated to the convexity or concavity is selected and configured so as to form natural looking stone appearance. The size, depth, and location with respect to the first and second ends of the convex or concave portions are configured to permit the convex portion of one block to engage the concave portion of another block. In one aspect, the first and second ends can be functionally configured to minimize the visible transition from one block to another when a plurality of blocks are engaged. Such functional configuration requires consideration and design based on shape, location of the convex and concave portions of each end, size of the convex and concave portions of each end, and optionally color consideration.

Due to the joining portions of each block being configured to resemble natural portions of decorative rock, the joint itself is allowed a greater range of joining while maintaining a minimized visible transition. For example, along a substantially horizontal surface, such as the ground in a garden area, the blocks can be engaged in a straight line. Alternatively, the blocks can be engaged at a right angle to each other, or at any angle between the right angle and a linear match. For any and all of these configurations, the first and second ends can be configured to minimize a visible transition from one block to another when the blocks are engaged. Furthermore, the first and second ends of the blocks can be configured to allow for angled vertical engagement of the blocks, under the same principle.

As such, a landscape border can be formed by engaging a plurality of blocks at first and second ends to form an integrated unit spanning a length. The length can be configured in a variety of arrangements, including straight, angled, curved, etc. In a specific embodiment, the border can include a curved configuration produced by engaging a plurality of blocks at angles sufficient to form the desired curvature. Furthermore, the integrated border unit can be configured throughout the entire length to minimize the visible transition from one block to another. The border can be placed on a substantially horizontal surface, or on a substantially angled surface, such as, e.g., an inclined landscape slope. Furthermore, the border can be configured to extend from horizontal to inclined ground. All the while for border configuration, the same block design can be utilized. There is no need to include specialized parts to terminate a border or for forming angled joints, or for resting on non-horizontal ground, as the blocks are configured to resemble decorative stone, and the concave-convex ends having the concavity and convexity with respect to vertical and horizontal planes allows for a natural look upon a wide range of engagement angles. Additionally, the border can be configured so as to minimize the amount to which the transition between blocks is visible. Such visible minimization produces an apparently integrated border, for although a number of separate blocks are present, the transition between one block to another is unapparent.

Borders prepared using the blocks as recited herein provide a plurality of functions. In one embodiment, the border provides a grass growing deterrent effect, in another embodiment, the border acts as a growth deterrent for other vegetation. In still another embodiment, the border effectively separates differing vegetation or material, and prevents or reduces migration or overgrowth between sections. Furthermore, the border visibly improves a landscape by providing distinct section divisions that are pleasing to the eye.

FIGS. 10a-10d illustrate a variety of landscape edging border lengths. FIG. 10a shows a straight length of landscape edging border. FIG. 10b shows a length including two right-angle joints wherein the sets of edging blocks are engaged at right angles, and where the engagement does not project joining portions out from the line of blocks, as with prior-art borders. FIG. 10c shows a length of border having three angled joints, where the angles are less than the right angles of FIG. 10b. FIG. 10d illustrates a curved arrangement where each block is engaged with other blocks at an angle, and where the overall effect is to have a curved landscape edging border. It should be noted that any length of any of the illustrated embodiments could easily be engaged with any length of any other embodiment to produce a landscape border that is custom to the desired landscape into which it is placed.

Figure 11:
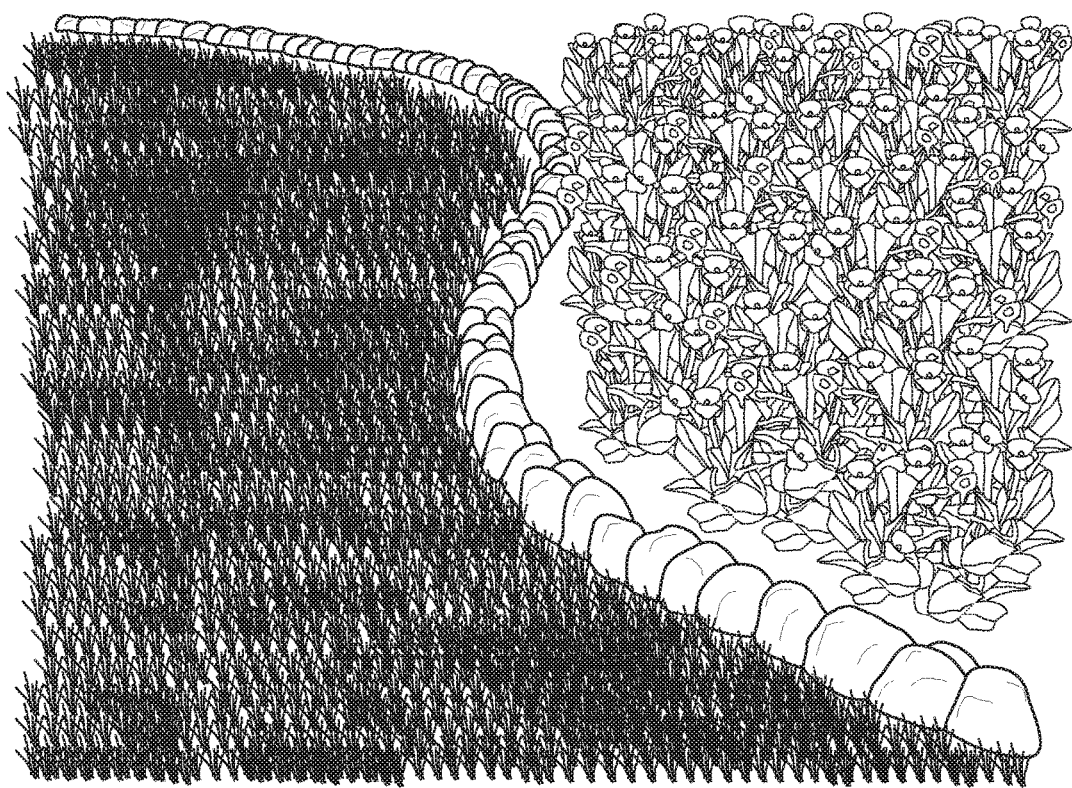
FIG. 11 is a drawing of a plurality of landscape edging blocks engaged to form a landscape edging border having a minimized transition effect between blocks, in accordance with an embodiment of the present invention.
Figure 12:
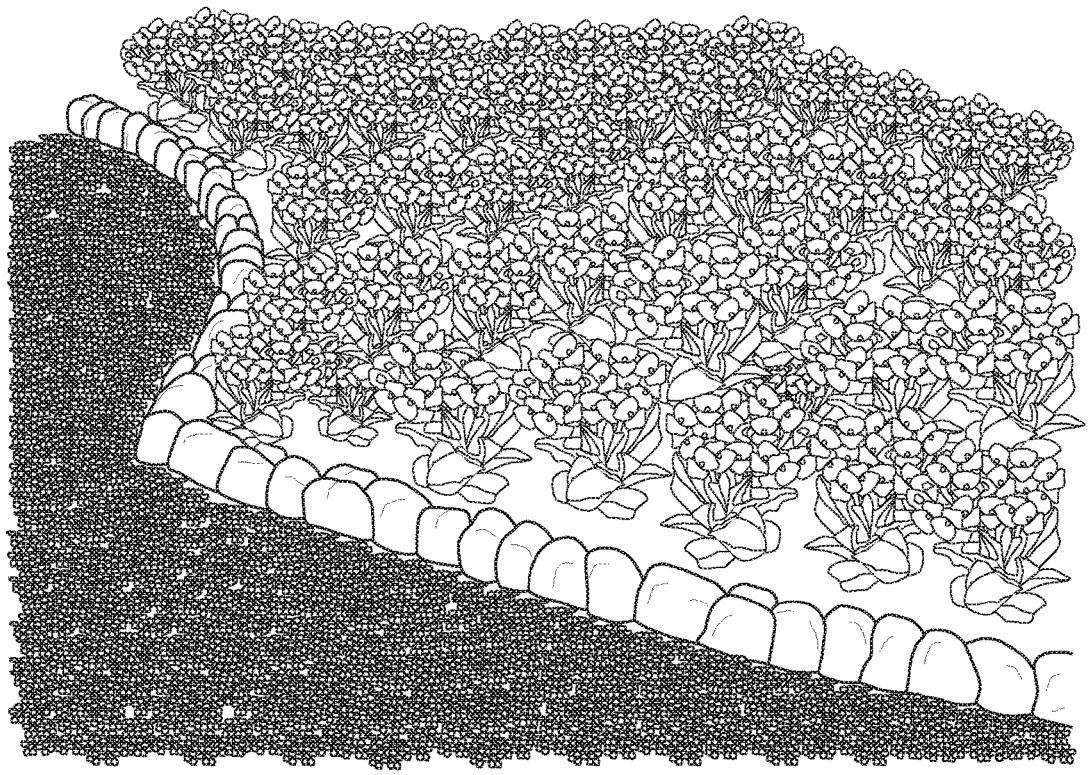
FIG. 12 is a drawing of another plurality of landscape edging blocks engaged to form a landscape edging border having a minimized transition effect between blocks, in accordance with an embodiment of the present invention.
Figure 13:
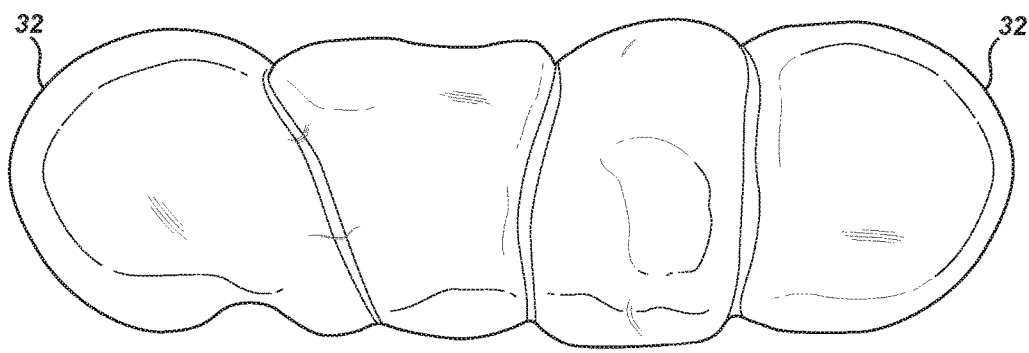
FIG. 13 is a direct view of a top surface of another landscape edging block, in accordance with an embodiment of the present invention.
Figure 14:
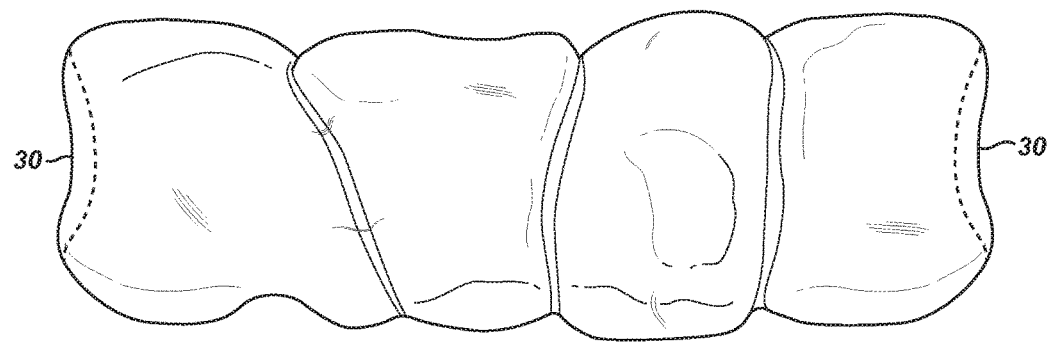
FIG. 14 is a direct view of a top surface of another landscape edging block, in accordance with an embodiment of the present invention.

To better illustrate the features of the blocks and boarders, FIG. 11 and FIG. 12 are included, which are photographs of borders. FIG. 11 shows a curving border used to separate grass and a garden area. As shown, the border looks like a series of separate rocks meticulously placed together in the curving line. The visible transition from one block to another is minimized by the bi-directional concavity and bi-directional convexity on opposite ends of each block. The blocks of FIG. 11, are arranged in a curve, where each consecutive block is not directly lined up with the previous block, but rather forms an angle. However, due to the nature of the blocks, the angling from one block to another visually appears as a smoothly curved edge. Additionally, the blocks utilized to form the border of FIG. 11 include detailing in the form of coloring to further create the look of individual decorative stones. It should also be noted that the blocks, as shown, include a substantially planar bottom that rests flush with the ground. On the side nearest the garden area, the bottom edge of the border is apparent, however, on the side near the grass, the bottom edge is shielded from view by the grass.

Similarly, FIG. 12 is a photograph of a border. As before, the border looks like a series of separate rocks meticulously placed together into the border shape. The visible transition from one block to another is minimized by the bi-directional concavity and bi-directional convexity on opposite ends of each block. Additionally, the border shown includes a linear section, and a curved section meeting at a nearly right angle. Due to the bi-directional concavity and bi-directional convexity features of the blocks, they can be arranged in such formations while maintaining the minimal visible transition from one block to the other. The illustrated border separates a flower garden area and a rock path. The bottom edge of the border is visible from the rock path.

In another embodiment, a landscape edging block can include both a first and a second end that are convex, where the convexity is with respect to both a horizontal and a vertical plane. As with other blocks, the block having two convex ends can further include a top and sides configured to resemble decorative stone or stones. For ease of discussion, the block having two convex ends will be referred to as a convex block (not shown). Alternatively, a landscape edging block can include both a first and a second end that are concave, where the concavity is with respect to both a horizontal and a vertical plane. For ease of discussion, the block having two concave ends will be referred to as a concave block (not shown). One or both of the convex and concave blocks can be integrated to any degree into a landscape border including the landscape blocks previously recited. For example, the convex block can be utilized as an endcap of a line of border that ends on a concave end. Other integrations could be utilized throughout the border, and selected and placed for a variety of reasons including, but not limited to, color preference, design preference, length of blocks, etc. Simply, a combination of convex and concave block engaged together, can be configured to integrate into the usual engagement of the other blocks in the landscape edging. Alternatively, a landscape edging can be composed only of convex and concave blocks, arranged in an ABAB pattern.

The resulting blocks and borders comprising a plurality of engaged blocks allow for relatively fast formation of a landscape edging border. The border can easily form a border around any number of shapes, and can do so without additional blocks or border components. The convex and concave portions of the blocks, where the convex and concave portions are with respect to both horizontal and vertical planes, provides for tight and secure engagement of the blocks, while still retaining a visibly aesthetic appearance, and further allows for visibly minimized transitions from block to block in the landscape border.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A landscape edging block, comprising:
a shaped structure having a first end and a second end, the first end including a surface that is concave simultaneously along a horizontal plane and a vertical plane, the second end including a surface that is convex simultaneously along a horizontal plane and a vertical plane, and including a top and sides configured to resemble decorative stone,
wherein at least one of the first end vertical plane concavity and the second end vertical plane convexity terminates at substantially the axis of the concavity or convexity, such that a truncated concave or convex shape is formed
wherein the first end of the block is configured to engage a second end of a second block in order to form a landscaping border.

2. The edging block of claim 1, further including a substantially planar bottom surface.

3. The edging block of claim 1, wherein the shaped structure comprises cement.

4. The edging block of claim 3, wherein the shaped structure consists of cement and coloring agent.

5. The edging block of claim 1, further comprising decorative coloring on the surface of the landscape edging block.

6. The edging block of claim 1, wherein the first end vertical plane concavity terminates at substantially the axis of the concavity.

7. The edging block of claim 1, wherein the first and the second ends are functionally configured to minimize a visible transition from one block to another when a plurality of blocks are engaged.

8. The edging block of claim 1, wherein the top and the sides of the block are configured to resemble a plurality of decorative stones.

9. The edging block of claim 1, wherein the second side of the block is configured to engage a first end of a second block at a range from a linear alignment to a right angle.

10. A landscape border comprising a plurality of landscape edging blocks as recited in claim 1, said blocks engaging one another at first and second ends to form an integrated unit spanning a length.

11. The border of claim 10, wherein the border is placed on a substantially horizontal surface.

12. The border of claim 10, wherein the border is placed on an inclined surface.

13. The border of claim 10, wherein at least two of the edging blocks are engaged at an angle.

14. The border of claim 13, wherein at least two of the edging blocks are engaged at a right angle.

15. The border of claim 10, wherein the border includes a curved configuration.

16. The border of claim 10, wherein the blocks are arranged in a manner so as to minimize a visible transition from one block to another.

17. A landscape edging block, comprising:
a shaped structure having a first end and a second end each including a surface that is concave simultaneously along a horizontal plane and a vertical plane, and including a top and sides configured to resemble decorative stone,
wherein at least one of the first end vertical plane concavity and second end vertical plane concavity terminates at substantially the axis of the concavity, such that a truncated concave shape is formed
wherein at least one of the first end or second end is configured to engage an end of another landscaping block having an end that includes a surface that is convex simultaneously along a horizontal plane and a vertical plane.

18. The edging block of claim 1, wherein the second end vertical plane convexity terminates at substantially the axis of the concavity of the landscape edging block.

19. The edging block of claim 1, wherein the first end vertical plane concavity terminates at substantially the axis of the concavity and the second end vertical plane convexity terminate at substantially the axis of the convexity of the landscape edging block.

20. The landscape edging block of claim 17, wherein both the first end vertical plane concavity and the second end vertical plane concavity terminate at substantially the axis of the concavity.

\* \* \* \* \*